J. T. H. DEMPSTER.
ELECTRODE.
APPLICATION FILED JULY 20, 1905. RENEWED APR. 6, 1910.
APPLICATION FILED DEC. 9, 1912.
976,990. Patented Nov. 29, 1910.
Fig. 1. Fig. 2. Fig. 3.
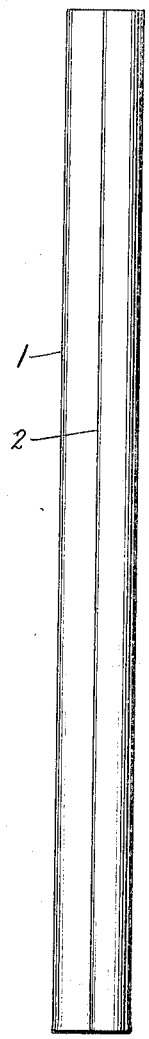
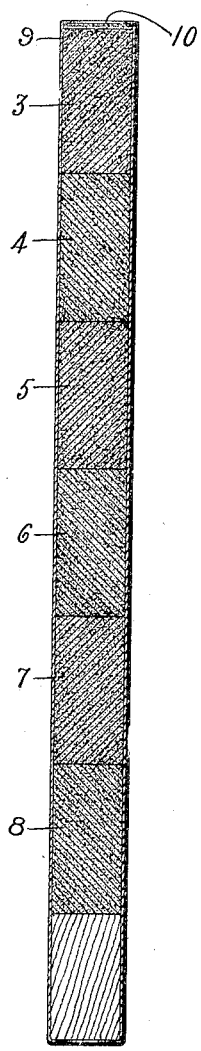
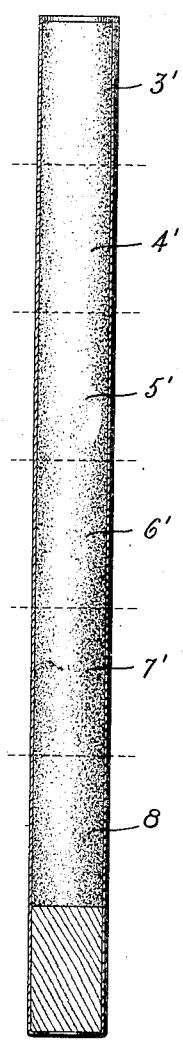
Fig. 4. Fig. 5. Fig. 6.
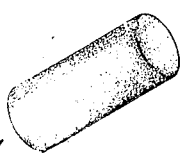
Witnesses:
Inventor:
John T. H. Dempster,
by
Att'y.

UNITED STATES PATENT OFFICE.

JOHN T. H. DEMPSTER, OF SCHENECTADY, NEW YORK, ASSIGNOR TO GENERAL ELECTRIC COMPANY, A CORPORATION OF NEW YORK.

ELECTRODE. REISSUED

976,990. Specification of Letters Patent. Patented Nov. 29, 1910.

Application filed July 20, 1905, Serial No. 270,470. Renewed April 6, 1910. Serial No. 553,842.

*To all whom it may concern:*

Be it known that I, JOHN T. H. DEMPSTER, a citizen of the United States, residing at Schenectady, county of Schenectady, State of New York, have invented certain new and useful Improvements in Electrodes, of which the following is a specification.

My present invention relates to electrodes and more particularly to electrodes which give what are known as flaming or luminous arcs. An advantageous method of forming such electrodes has been found to consist in placing the electrode material proper in a metallic tube or shell. In assembling such electrodes the following methods have frequently been employed heretofore. The electrode material has been placed in the tube or shell in the form of a powder or it has been molded into pencils and the pencils inserted in the tube or shell. When the electrode material is inserted in the tube in the form of a powder, a certain amount of compression is necessary in order to render the electrode compact and homogeneous. Owing to the physical characteristics of the electrode material ordinarily employed if a shell say 6 to 12 inches in length is first filled with the powdered material and an attempt is then made to compress the material into the tube, difficulty is experienced from the fact that the powdered material does not flow readily. To obviate this difficulty the tubes while being gradually filled with powdered material have been agitated in order that the powdered material may pack under the action of gravity. With this method, however, the density of the powdered material at the lower end of the tube is usually greater than the density of the powdered material at the upper end of the tube. I have found that these difficulties may be obviated if the tube is filled with the powdered material in stages or sections, and after each stage or section is filled the material in the tube be compressed by some external means such as the plunger of a suitable press. With this method of operation and the pressure usually employed an efficient electrode is obtained in which the density of the powdered material is practically uniform through the electrode. When the body portion of the electrode is in the form of a molded pencil certain difficulties are also experienced if the molded pencil has the length of the ordinary electrode, say from 6 to 12 inches. In molding such pencils the electrode material in the form of a powder is moistened slightly and then is molded in a press, after which it is baked to drive off the moisture. The baking operation cements the particles together, probably by reason of a slight oxidation or from other cause. As the conditions require that the pencils should fit tightly in the inclosing tubes or shells difficulty is sometimes experienced in inserting the pencils in the cases, particularly as slight deformations of the pencils are frequently produced in the baking operation. Some difficulty is also experienced in obtaining a molded pencil of uniform density from the same or similar causes as those which render it difficult to obtain a uniform density of dry powdered material in an inclosing shell or case as above set forth. These difficulties, however, are less marked with the molded pencils than with the electrode first described.

I have found that excellent results are obtained by forming the molded filling for the tube or casing in short sections and inserting sections one at a time in the tube or casing. By this method the irregularities in form or density of the pencils produced are much smaller than with molded pencils of greater length. The features of my invention hereinbefore set forth are of more or less general utility. I have obtained excellent results, however, in employing the invention in connection with the electrodes formed essentially of oxygen compounds of iron, titanium and chromium. In particular I have employed it in conjunction with electrodes formed of approximately 70 parts of magnetite and 30 parts of rutile to which is added from 12½ to 15 percent. by weight of chromite.

With an electrode containing different materials such for instance as an electrode having the composition above described, I have found that the composition of the electrode some times changes with its consumption. In other words, in the consumption of the electrode various constituents contained in a given portion of the electrode as originally formed are not consumed in the same period. As a result the composition of the arcing portion of the electrode may vary sometimes continuously and according to some fixed law, as the electrode consumes. By forming the electrode in sections as has been hereinbefore described, it is possibe to compensate for such changes in composition of the electrode by slightly varying the composition of the different sections forming one electrode, putting in the sections more remote from the arcing end of the electrode more of the constituents which are the more rapidly consumed and less of the constituents which are more slowly consumed than in the sections less remote. For instance, I have sometimes found it advisable to decrease the refractory chromite content of an electrode of the composition above described in the sections remote from the arcing end of the electrode.

With electrodes having a composition substantially as set forth above, difficulties are occasionally experienced from a pit or crater formation in the arcing end of the electrode when the electrode is initially started. If for any reason a minute crater or pit is formed at the arcing end of the electrode when initially started, there is a tendency for the pit or crater to automatically increase in depth and maintain itself for a considerable period of time. I have found, however, that this trouble may be almost entirely avoided if the entire arcing end of the electrode be treated with a small amount of material which is more easily fusible than the body of the electrode. The advantage from the use of this easily fusible material I think is probably due to the fact that it tends to make the arcing end of the electrode uniformly and easily fusible. It also insures a fat arc when the electrode is initially put into operation.

When the electrode is treated as above described, the arc wanders slowly over the entire arcing surface of the electrode without the formation of a crater at any point. After the electrode has been put in service and the arc has played over its entire arcing surface difficulty is seldom experienced in subsequently starting a satisfactory arc from the electrode.

The various features of novelty which characterize my invention are pointed out with particularity in the claims annexed to and forming a part of this specification. For a better understanding of my invention, however, reference may be had to the accompanying drawing and descriptive matter in which I have illustrated and described somewhat in detail forms in which my invention may be embodied.

Of the drawings, Figure 1 is an elevation of an electrode comprising a metal tube and a filling in the form of molded pencils of a short length; Fig. 2 is a section of the electrode shown in Fig. 1; Fig. 3 is a sectional elevation of an electrode comprising a metal tube and powdered filling; Fig. 4 is a perspective view of the metal disk inclosing the arcing end of the tube; Fig. 6 is a similar view of the paper wad or cap saturated with a fusible salt; and Fig. 5 is a perspective view of one of the short pencils.

Referring to the drawings, 1 represents a metal tube or casing which may be formed out of a strip of sheet iron the edges of which are united in a lap seam 2. The lower end of the tube 1 is closed by a disk which may be formed of any suitable material such as wood and is retained in place by crimping over on it the lower end of the tube 1. The tube 1 has inserted in it in any suitable manner, as by means of a plunger of a press suitable for the purpose, a number of molded pencils or sections 3, 4, 5, 6, 7 and 8, which may be made in any suitable manner. At the upper end of the upper pencil or section 3 is placed a disk of any suitable absorbent material such as paper, which has been saturated with some easily fusible material such as potassium titinate or carbonate. Over the disk 9 is placed a thin disk formed of metal such as iron 10. The upper end of the tube 1 is crimped over the edges of the disk 10 to secure it in place. The sections, 3, 4, 5, 6, 7 and 8, may in many cases be identical in form and composition. When it is desired to graduate the composition of the electrode to compensate for its consumption as by placing in some of the sections more chromite than in others the sections may differ slightly in composition from each other. For instance, sections 3, 4, 5, 6 and 7 may each contain more chromite than sections 4, 5, 6, 7 and 8, respectively.

The construction shown in Fig. 3 differs from that shown in Figs. 1 and 2 in that the sections 3′, 4′, 5′, 6′, 7′ and 8′ are formed of powdered material, the section last enumerated being inserted first and compressed and the other sections successively thereafter. The sections 3′, 4′, 5′, 6′, 7′ and 8′ may be identical in composition or may vary in the manner described above with reference to the sections 3, 4, 5, 6, 7 and 8.

While I have described the best forms of my invention now known to me, it will be obvious to those skilled in the art that changes may be made in the form of the invention disclosed without departing from the spirit thereof, and that certain features of my invention may be employed with advantage in some cases without the corresponding use of other features of my invention.

What I claim as new and desire to secure by Letters Patent of the United States, is,—

1. An electrode consisting of a casing and a filling therefor in successive sections of substantially uniform density.

2. An electrode consisting of a casing and a filling therefor in successive sections of substantially uniform density, each section consisting of a compound giving a luminous arc.

3. An electrode consisting of a casing, and a filling therefor, the composition of which varies along the length of the electrode.

4. An electrode, the body portion of which varies in composition along its length and is capable of giving a luminous arc.

5. An electrode, the body portion of which is compounded of refractory materials of different degrees of refractoriness, the percentage of the more refractory constituents increasing toward the arcing end of the electrode.

6. An electrode, the body portion of which is made of a compound of magnetite, rutile and chromite, the percentage of chrotalic oxids and having at its arcing end an the electrode.

7. An electrode formed essentially of metallic oxides and having at its arcing end an easily fusible compound.

8. An electrode formed essentially of metallic oxides and having at its arcing end a fusible salt.

9. An electrode formed essentially of metallic oxids and having at its arcing end a quantity of potassium carbonate.

10. An electrode comprising a body portion of metallic compounds, at the arcing end of which is placed a mass of absorbent material saturated with an easily fusible compound.

11. An electrode comprising a tube, a filling therefor, an absorbent mass treated with a solution of vaporizable compound placed at one end of said filling, a retaining member covering said absorbent mass, and held in place by the crimping over of the end of the tube or casing.

12. An electrode at one end of which is placed an amount of absorbent material saturated with an easily fusible compound.

13. An electrode comprising a body portion of a given composition, and a starting material of different composition placed at the arcing end of the electrode.

In witness whereof, I have hereunto set my hand this 18th day of July, 1905.

JOHN T. H. DEMPSTER.

Witnesses:
BENJAMIN B. HULL,
MARGARET E. WOOLLEY.